United States Patent
Studart et al.

(10) Patent No.: US 11,787,958 B2
(45) Date of Patent: Oct. 17, 2023

(54) SILICONE 3D PRINTING INK

(71) Applicant: ETH Zurich, Zurich (CH)

(72) Inventors: André R. Studart, Zurich (CH);
Manuel Schaffner, Zurich (CH); Lucas Raphael Pianegonda, Bonaduz (CH)

(73) Assignee: ETH Zurich, Zürich (CH)

( * ) Notice: Subject to any disclaimer, the term of this patent is extended or adjusted under 35 U.S.C. 154(b) by 661 days.

(21) Appl. No.: 16/647,081

(22) PCT Filed: Sep. 17, 2018

(86) PCT No.: PCT/EP2018/075067
§ 371 (c)(1),
(2) Date: Mar. 13, 2020

(87) PCT Pub. No.: WO2019/053258
PCT Pub. Date: Mar. 21, 2019

(65) Prior Publication Data
US 2020/0216692 A1    Jul. 9, 2020

(30) Foreign Application Priority Data

Sep. 15, 2017 (EP) ..................... 17191485

(51) Int. Cl.
| | |
|---|---|
| *B33Y 70/00* | (2020.01) |
| *C09D 11/101* | (2014.01) |
| *B33Y 10/00* | (2015.01) |
| *B33Y 80/00* | (2015.01) |
| *B29C 64/112* | (2017.01) |
| *C09D 11/52* | (2014.01) |
| *B29K 83/00* | (2006.01) |
| *B29K 105/00* | (2006.01) |
| *B29L 31/00* | (2006.01) |

(52) U.S. Cl.
CPC .......... *C09D 11/101* (2013.01); *B29C 64/112* (2017.08); *B33Y 10/00* (2014.12); *B33Y 70/00* (2014.12); *B33Y 80/00* (2014.12); *C09D 11/52* (2013.01); *B29K 2083/00* (2013.01); *B29K 2105/0023* (2013.01); *B29K 2995/0005* (2013.01); *B29K 2995/0082* (2013.01); *B29L 2031/748* (2013.01)

(58) Field of Classification Search
None
See application file for complete search history.

(56) References Cited

U.S. PATENT DOCUMENTS

| | | |
|---|---|---|
| 5,084,489 A | 1/1992 | Liles |
| 5,302,627 A | 4/1994 | Field et al. |
| 9,732,239 B2 | 8/2017 | Clapp et al. |
| 10,041,108 B2 | 8/2018 | Barish et al. |
| 10,155,884 B2 | 12/2018 | Kenney et al. |
| 2004/0131823 A1* | 7/2004 | Rodgers .................. B29C 48/07 264/108 |
| 2006/0208388 A1* | 9/2006 | Bredt ..................... B33Y 70/00 156/305 |
| 2017/0283655 A1* | 10/2017 | Kenney ................. B29C 64/118 |

FOREIGN PATENT DOCUMENTS

| | | |
|---|---|---|
| CN | 105683258 A | 6/2016 |
| CN | 106062211 A | 10/2016 |
| CN | 106804110 A | 6/2017 |
| EP | 0437247 A2 | 7/1991 |
| JP | H-08-183055 A * | 7/1996 |
| JP | H08183055 A | 7/1996 |
| JP | 2010185991 A | 8/2010 |
| JP | 2015193820 A | 11/2015 |
| WO | 2013160252 A2 | 10/2013 |
| WO | 2016044547 A1 | 3/2016 |
| WO | WO-2016-044547 A1 * | 3/2016 |
| WO | 2016148890 A1 | 9/2016 |

OTHER PUBLICATIONS

Nguyen et al., "Ultrafast Diffusion-Controlled Thiol-ene Based Crosslinking of Silicone Elastomers with Tailored Mechanical Properties for Biomedical Applications," Polymer Chemistry, The Royal Society of Chemistry, 2016, pp. 5281-5293, vol. 7.

Sears et al., Emulsion Inks for 3D Printing of High Porosity Materials, Macromolecular Rapid Communications, 2016, pp. 1369-1374, vol. 37, DOI: 10.1002/marc.201600236.

Wallin et al., Click chemistry stereolithography for soft robots that self-heal, J. Mater. Chem. B, 2017, pp. 6249-6255, vol. 5, DOI: 10.1039/c7tb01605k.

* cited by examiner

*Primary Examiner* — Mohammad M Ameen
(74) *Attorney, Agent, or Firm* — The Webb Law Firm (57) ABSTRACT

An additive manufacturing ink composition includes a polysiloxane bearing a plurality of alkenyl groups and a crosslinking agent bearing a plurality of thiol groups. The polysiloxane and the crosslinking agent form an emulsion.

9 Claims, 3 Drawing Sheets

SILICONE 3D PRINTING INK

CROSS-REFERENCE TO RELATED APPLICATIONS

This application is the United States national phase of International Application No. PCT/EP2018/075067 filed Sep. 17, 2018, and claims priority to European Patent Application No. 17191485.6 filed Sep. 15, 2017, the disclosures of which are hereby incorporated by reference in their entirety.

BACKGROUND OF THE INVENTION

Field of the Invention

The present invention relates to additive manufacturing ink compositions based on polysiloxanes and their use in additive manufacturing.

Description of Related Art

Additive manufacturing, also widely known as 3D printing, rapid prototyping and freeforming, refers to processes used to create a three-dimensional object in which layers of material are formed, i.e. added, under computer control to manufacture an object in a layer-by-layer or continuous fashion.

A large number of materials, ranging from metals to synthetic resins and so forth are available today for additive manufacturing. In one type of additive manufacturing, a layer of a liquid cross-linkable material is deposited according to a predetermined pattern using an apparatus equipped with a nozzle. Examples of such a type of additive manufacturing are 3D printing of elastomers and hydrogels, both of which need to be cross-linked. After deposition of a layer of cross-linkable material, the cross-linkable material is cross-linked by either exposing it for example to radiation, a change in temperature or by contacting it with a chemical cross-linking agent to obtain a self-supporting structure onto which further layers can then be deposited and crosslinked. Alternatively, an object may integrally be formed from the cross-linkable material in a first step and integrally cross-linked in a subsequent step.

In the context of additive manufacturing, such a cross-linkable material accessible by additive manufacturing is commonly referred to as an "ink".

Polysiloxanes, also known as silicones, have so far not been extensively used in the field of additive manufacturing due to several problems inherent to this class of chemical compounds. On one hand, polysiloxanes exhibit high viscosities that make it difficult to accurately dose polysiloxanes and on the other hand polysiloxanes exhibit rather poor viscoelastic properties that make it difficult to provide inks that retain shape after deposition (e.g. that do not flow or bleed). The above issues are exacerbated by the fact that most of the cross-linking chemistries that can be used to cross-link polysiloxanes either employ (toxic) (organo-) metal catalysts (thereby limiting use in biomedical applications) and/or require impractical cross-linking times (reducing attractiveness versus molding) and/or require high temperatures (requiring extra heating devices).

It is thus desirable to provide an alternative type of silicone-based inks that can be more conveniently used in the context of additive manufacturing by a reduced curing time and whose cross-linked products are free from (toxic) catalyst residues.

EP 0 437 247 A2 discloses UV curable silicone resin-organic mercaptan compositions, in which a polysiloxane functionalized with at least two aliphatic unsaturated radicals which can react with a mercaptan having two or more mercapto groups as well as a free radical photoinitiator and a free radical inhibitor. The composition is formed by mixing the components of the composition to a transparent compatible mixture and is then cast unto different substrates to form a coating.

JP20100185991 A discloses cross-linkable compositions for the manufacturing of microlenses comprising a polysiloxane having an unsaturated bond group, a polysiloxane different from the aforementioned polysiloxane, a mercapto compound, a photoinitiator and an organic solvent for the dissolution of the aforementioned compounds. The composition is applied as film coating to a substrate and cross-linked using radiation and heat.

U.S. Pat. No. 5,302,627 B discloses a UV cross-linkable composition useful as protective coating in the electronics industry. The composition comprises an alkenyl-containing polymethylsiloxane, a mercaptoalkyl-containing compound such as glycol dimercaptoacetate, a photoinitiator such as benzophenone as well as dye that indicates the degree of cross-linking via a color change.

JP2015193820 A discloses a curable resin composition containing a modified silicone compound having two or more alkenyl groups, a polythiol compound, having two or more thiol groups as well as a free radical photoinitiator for coating touchscreens with a protective layer.

WO 2013/160252 A2 discloses compositions to form dry silicone gels that can act as sealants, said compositions comprising a mix of vinyl-terminated polydimethylsiloxane, a cross-linker/chain extender having 2 or more thiol groups, a free radical initiator and a toughening agent such as fumed silica. The compositions can be cross-linked with UV radiation or heat.

Ultrafast diffusion-controlled thiol-ene based crosslinking of silicone elastomers with tailored mechanical properties for biomedical applications. Khai D. Q. Nguyen, William V. Megone, Dexu Kongab and Julien E. Gautrot *Polym. Chem.*, 2016, 7, 5281-5293 discloses a composition in which a vinyl-polysiloxane and a thiol-polysiloxane can be cross-linked via UV radiation. Coatings of said composition were cast on cover slips to allow for further characterization of the coatings.

JP2010-185991A discloses low viscosity compositions for UV-curable thin films for use in the field of fiber optics, which compositions include a polysiloxane resin functionalized with aliphatic unsaturated groups and an organic mercaptan as cross-linker.

WO2016/044547A1 discloses a photocurable silicone composition for use in 3d printing. The composition includes a blend of least a polysiloxane resin functionalized with aliphatic unsaturated groups and a polysiloxane resin functionalized with thiol groups as cross-linker.

SUMMARY OF THE INVENTION

The present invention solves the above problems by providing an additive manufacturing ink composition, which is free from any solvents, is free from (toxic) metal compounds such as tin or platinum catalysts and which can be used as-is in conventional additive manufacturing apparatuses because of its excellent rheological properties, both at rest and under shear. The rheological properties are achieved by forming an emulsion in which the low viscosity cross-linking agent is dispersed in a phase of polysiloxane bearing a plurality of alkenyl groups, which emulsion can further be stabilized and tailored in term of viscosity using emulsion stabilizers. Examples of emulsion stabilizers are surfactants, fumed silica and nanoclays. The advantage of using an emulsion in additive manufacturing has the advantage of conferring shear-thinning properties to the ink, which leads a drop in viscosity under shear and thus facilitates extrusion.

It is an object of the present invention to provide an additive manufacturing ink composition comprising (A) a polysiloxane bearing a plurality of alkenyl groups and (B) a crosslinking agent bearing a plurality of thiol groups, characterized in that the polysiloxane bearing a plurality of alkenyl groups and the crosslinking agent bearing a plurality of thiol groups are immiscible and form an emulsion.

It is a further object of the present invention to provide a process for producing an additive manufacturing ink composition as described above, wherein the polysiloxane bearing a plurality of alkenyl groups and the crosslinking agent bearing a plurality of thiol groups are formed into an emulsion.

It is a further object of the present invention to provide a use of the additive manufacturing ink composition as described above for the additive manufacturing of an object composed of multiple materials.

It is a further object of the present invention to provide an ink container, such as a cartridge, configured for use in an additive manufacturing apparatus, said container containing a volume of additive manufacturing ink composition as described above.

It is a further object of the present invention to provide a process of additive manufacturing an object from an additive manufacturing ink composition as described above, wherein said object is manufactured by dispensing or forming a layer of additive manufacturing ink composition to form a green layer and subsequently crosslinking said green layer through exposure to UV/Vis radiation, in particular through exposure to radiation having a wavelength of from 365 nm to 420 nm, before dispensing or forming a further layer of additive manufacturing ink composition. The exposure to UV/Vis radiation may range between 8.5 s and 60 s.

It is a further object of the present invention to provide a process of additive manufacturing an object from an additive manufacturing ink composition as described above, wherein said object is manufactured by first dispensing or forming multiple layers of additive manufacturing ink composition until a green object or a part thereof is formed and by subsequently crosslinking the multiple layers of the green object or a part thereof through exposure to UV/Vis radiation, in particular by exposure to radiation having a wavelength of from 365 nm to 420 nm. The exposure to UV/Vis radiation may range between 8.5 s and 60 s.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 (A) shows the dependence of storage modulus G' (filled) and loss modulus G" (empty) of the soft (triangles), intermediate (squares) and stiff (circles) inks as a function on the strain amplitude applied in an oscillatory sweep measurement. (B) shows the dependence of viscosity of the soft (triangles), intermediate (squares) and stiff (circles) inks as a function on the strain amplitude applied in an oscillatory sweep measurement. (C) shows the stress-strain curve for the cross-linked soft (triangles), intermediate (squares) and stiff (lozenges) inks when respectively cast (filled) and in parallel to the printing direction when printed (empty) whereas (D) shows the stress-strain curve for the cross-linked soft (triangles), intermediate (squares) and stiff (lozenges) inks in the case printed filaments directly are cross-linked essentially upon deposition (empty) and in the case the printed filaments are deposited continuously in one run and cross-linked as a whole after printing (filled).

DESCRIPTION OF THE INVENTION

It is an object of the present invention to provide an additive manufacturing ink composition comprising (A) a polysiloxane bearing a plurality of alkenyl groups and (B) a crosslinking agent bearing a plurality of thiol groups, characterized in that the polysiloxane bearing a plurality of alkenyl groups and the crosslinking agent bearing a plurality of thiol groups form a emulsion, which emulsion may be a stabilized emulsion. The emulsion may be stabilized with emulsion stabilizers such as surfactants and dispersants or may be stabilized with rheological modifiers such as fumed silica or nanoclays. The additive manufacturing ink composition can be used in typical 3D printers in which a cartridge holding the additive manufacturing ink composition is fluidly connected to a nozzle through which the additive manufacturing ink composition is then applied onto a substrate. It is understood that the additive manufacturing ink composition may comprise one polysiloxane bearing a plurality of alkenyl groups or a mixture of polysiloxanes bearing a plurality of alkenyl groups. It is further understood that the additive manufacturing ink composition may comprise one crosslinking agent bearing a plurality of thiol groups or a mixture of crosslinking agents bearing a plurality of thiol groups. In the context of the present invention, the term "additive manufacturing" refers not only to direct ink writing (DIW) methods in which the ink is progressively deposited to form a 3D object, but also refers other manufacturing methods such as stereolithography (SLA), selective laser sintering (SLS), Multi Jet Fusion, film transfer imaging, etc. However, the additive manufacturing ink compositions according to the present invention are particularly well-suited for extrusion or stereolithography methods such as for example DIW.

The polysiloxanes bearing a plurality of alkenyl groups useful in the present invention are for example polyorganosiloxanes bearing a plurality of alkenyl groups. Examples of polyorganosiloxanes are polyalkenylsiloxanes or polyalkylsiloxanes. In the polyorganosiloxanes, the organo moiety may be the same (for example as in PDMS) or may vary within a single molecule (for example diphenyl dimethicone).

The polysiloxanes bearing a plurality of alkenyl groups useful in the present invention may have a viscosity between $10-10^4$ Pa*s, preferably $10^2-10^3$ Pa*s when measured at a shear rate of 1/s according to dynamic mechanical analysis.

In a preferred embodiment of the additive manufacturing ink composition according to the present invention, the additive manufacturing ink composition comprises a polysiloxane component comprising a polysiloxane bearing a plurality of alkenyl groups and a polysiloxane resin and a crosslinking agent bearing a plurality of thiol groups, characterized in that the polysiloxane bearing a plurality of alkenyl groups and the crosslinking agent bearing a plurality of thiol groups form a stable emulsion.

In a preferred embodiment of the additive manufacturing ink composition according to the present invention, the additive manufacturing ink composition may thus optionally comprise a polysiloxane resin, which is different from the polysiloxane bearing a plurality of alkenyl groups, and which may in particular be a silanol-trimethylsilyl-modified polysiloxane Q resin or a polysiloxane MQ resin. If present, the reinforcing polysiloxane resin may be present in an amount of up to 50 wt % and preferably up to 100 wt % with respect the total amount of polysiloxane in the additive manufacturing ink composition. Stated alternatively, the weight ratio between the reinforcing polysiloxane resin, if present, and the polysiloxane bearing a plurality of alkenyl groups may be of from 0 to 1 or 0.1 to 1. The reinforcing polysiloxane resin may preferably be included in the additive manufacturing ink composition in the case where the cross-linked additive manufacturing ink composition should exhibit "intermediate" or "stiff" mechanical properties such as medium or low elongation at break, i.e. below 500% and 250%, respectively. In the case where the cross-linked additive manufacturing ink composition should exhibit "soft" mechanical properties such as high elongation at break, i.e. above 500%, the reinforcing polysiloxane resin is preferably omitted. The reinforcing polysiloxane resin may preferably be included in the additive manufacturing ink composition in the case where the cross-linked additive manufacturing ink composition should exhibit "intermediate" or "stiff" mechanical properties such as medium or high stiffness, i.e. above 1 MPa and 3 MPa, respectively. In the case where the cross-linked additive manufacturing ink composition should exhibit "soft" mechanical properties such as low stiffness, i.e. below 1 MPa, the reinforcing polysiloxane resin is preferably omitted.

In a preferred embodiment of the additive manufacturing ink composition according to the present invention, the crosslinking agent is a capable of being activated upon exposure to radiation, in particular upon exposure to UV/Vis radiation. UV/Vis radiation having a wavelength of from 365 nm to 420 nm can easily be generated using mercury vapor lamps or energy-efficient LED lamps and has the advantage of being able to penetrate deeply into the bulk of the additive manufacturing ink composition according to the present invention such as to allow the effective cross-linking of thicker layers of additive manufacturing ink composition according to the present invention. It has been found that surprisingly, the penetration depth of such UV/Vis radiation having a wavelength of from 365 nm to 420 nm into the additive manufacturing ink composition according to the present invention is very high, i.e. is up to 10 mm, in particular for radiation times between 8.5 s and 60 s. This allows using the LED lamps at relatively low intensity, i.e. 20 mW/cm². Alternatively, the crosslinking agent may be capable of being activated upon exposure to a change in temperature such as an increase in temperature or a decrease in temperature.

In a preferred embodiment of the additive manufacturing ink composition according to the present invention, the additive manufacturing ink composition further comprises a crosslinking enhancer compound. The crosslinking enhancer may be chosen from N-alkenyl carbazoles such as for example N-vinyl carbazole. Without wishing to be held to a particular theory, it is believed that the N-alkenyl carbazole acts as a free radical polymerisation enhancer that allows for a more complete crosslinking of the components in the emulsion.

In a preferred embodiment of the additive manufacturing ink composition according to the present invention, in the additive manufacturing ink composition the polysiloxane bearing a plurality of alkenyl groups forms the continuous phase of the emulsion and the crosslinking agent bearing a plurality of thiol groups forms the discontinuous phase. Within said emulsion, the discontinuous phase, which is mainly present as droplets having a diameter of no more than 100 micrometers, preferably of less than 10 micrometers, which allows the emulsion to remain thermodynamically stable and to exhibit a good shelf life.

In a preferred embodiment of the additive manufacturing ink composition according to the present invention, the additive manufacturing ink composition further comprises emulsion stabilizers such as solid particles as emulsion stabilizers, such as pyrogenic silica, titania, talc, chalk, laponite or clay. The amount of solid particles comprised in the additive manufacturing ink composition is preferably chosen such that the viscosity of the composition is in excess of 10 Pa*s, or between 10 Pa*s to 10.000 Pa*s. For instance, when fumed silica is used as solid particles, the amount of fumed silica can be between 0.1 to 15 wt %, preferably between 3 to 13 wt %, based on the total weight of the additive manufacturing ink composition. Likewise, the additive manufacturing ink composition may comprise suitable solid particles as emulsion stabilizers in general in an amount of between 0.1 to 15 wt %, preferably between 3 to 13 wt %, based on the total weight of the additive manufacturing ink composition. Suitable solid particles that may be used as emulsion stabilizers are solid particles having a diameter of less than 200 nm or preferably less than 100 nm, and in which particle agglomerates, if present, do not exceed 100 μm in diameter. An example of such solid particles is fumed silica, commercially available from Wacker Chemie AG (DE), under designations HDK H18 (hydrophobic fumed silica) and V15 (hydrophilic fumed silica).

In a preferred embodiment of the additive manufacturing ink composition according to the present invention, the polysiloxane bearing a plurality of alkenyl groups is a α, ω-alkenyl terminated polysiloxane bearing two alkenyl groups, and is preferably a α, ω-vinyl terminated polyorganosiloxane such as for example α, ω-vinyl terminated polydimethylsiloxane. Suitable polysiloxanes bearing a plurality of alkenyl groups that may be used in the additive manufacturing ink composition can be polysiloxanes having a viscosity of from 1500 to 30,000 cps. Exemplary polysiloxane are EcoFlex 00-30 A and DragonSkin 30 A from Smooth-On (US) and Sylgard 184 from DowCorning (US).

In a preferred embodiment of the additive manufacturing ink composition according to the present invention, the crosslinking agent bearing a plurality of thiol groups is a crosslinking agent bearing at least three thiol groups, in particular is a derivative of pentaerythritol bearing two or more, e.g. three or four, thiol groups. Exemplary crosslinking agents bearing a plurality of thiol groups suitable for the additive manufacturing ink composition according to the present invention are trimethylolpropane trithioglycolate, 1,2,6-hexanetriol trithioglycolate, trimethylolpropane tri-(3-mercaptopropionate), trimethylolethane trithioglycolate, polyethylene glycol dimercaptoacetates, glycol dimercaptoacetate and dipentaerythritol hexa-(3-mercaptopropionate), pentaerythritol tetrakis(3-mercaptopropionate) and pentaerythritol tris(3-mercaptopropionate). In a more preferred embodiment of the additive manufacturing ink composition according to the present invention, the crosslinking agent bearing a plurality of thiol groups is present in between 2 wt % to 35 wt % based on the total weight of the additive manufacturing ink composition. The mechanical properties of the cross-linked additive manufacturing ink composition can be adjusted by varying the amount and thiol functionality of the crosslinking agent, the molecular weight (length), the amount of alkenyl functionalization and the viscosity of the polysiloxane or the amount of solid particles. For instance, the crosslinking agent bearing a plurality of thiol groups may preferably be included in the additive manufacturing ink based at 15 wt % to 35 wt %, based on the total weight of the additive manufacturing ink composition, in the case where the cross-linked additive manufacturing ink composition should exhibit "intermediate" or "stiff" mechanical properties such as medium or low elongation at break, i.e. below 500% and 250%, respectively. In the case where the cross-linked additive manufacturing ink composition should exhibit "soft" mechanical properties such as high elongation at break, i.e. above 500%, the crosslinking agent bearing a plurality of thiol groups is included in the additive manufacturing ink based at 2 wt % to 15 wt %, based on the total weight of the additive manufacturing ink composition.

In a preferred embodiment of the additive manufacturing ink composition according to the present invention, the crosslinking agent bearing a plurality of thiol groups has a molecular weight below 1000 g/mol and more preferably of below 750 g/mol.

In a preferred embodiment of the additive manufacturing ink composition according to the present invention, the additive manufacturing ink composition further comprises a free radical photoinitiator, which is preferably capable of being activated upon exposure to radiation, in particular upon exposure to UV/Vis radiation having a wavelength of from 365 nm to 420 nm. Exemplary free radical photoinitiators suitable for the additive manufacturing ink composition according to the present invention are acetophenone, anisoin, anthraquinone, benzil, benzoin, benzoin ethyl ether, benzoin isobutyl ether, benzoin methyl ether, benzophenone, 1-hydroxycyclohexyl phenyl ketone, 3,3',4,4'-benzophenonetetracarboxylic dianhydride, benzoylbiphenyl, 2-benzyl-2-(dimethylamino)-4'-morpholinobutyrophenone, 4,4'-bis(diethylamino) benzophenone, 4,4'-bis(dimethylamino) benzophenone, camphorquinone, 2-chlorothioxanthen-9-one, dibenzosuberenone, 2,2-diethoxyacetophenone, 4,4'-dihydroxybenzophenone, 2,2-dimethoxy-2-phenylacetophenone. 4-(dimethylamino) benzophenone, 4,4'-dimethylbenzil, 2,5-dimethylbenzophenone, 3,4-dimethylbenzophenone, diphenyl(2,4,6-trimethylbenzoyl) phosphine oxide/2-hydroxy-2-methylpropiophenone, 4'-ethoxyacetophenone, 2-ethylanthraquinone, 3 3'-hydroxyacetophenone, 4 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, and thioxanthen-9-one, and mixtures thereof. In a much preferred embodiment of the additive manufacturing ink composition according to the present invention, the additive manufacturing ink composition comprises 1-hydroxycyclohexyl phenyl ketone as a free radical photoinitiator.

In a much preferred embodiment of the additive manufacturing ink composition according to the present invention, the additive manufacturing ink composition comprises an electrically conductive material in an amount sufficient to confer electrical conductivity to the additive manufacturing ink composition and/or a reinforcing fiber capable of being oriented, for example along the flow of the additive manufacturing ink composition or along any direction imparted to the fibers after the of additive manufacturing ink composition. The electrically conductive material may be a metal or an alloy thereof and may further be a conductive polymer such as polyaniline or poly-3,4-ethylendioxythiophen. Alternatively, it may be in the form of a ferromagnetic material such as a ferromagnetic metal particles or fibers such as to be oriented by a magnetic field. In the case where an electrically conductive material is incorporated into the additive manufacturing ink composition, the electrically conductive material can be in the form of solid particles or in the form of continuous or discontinuous fibers, in which case the fibers may also have the function of reinforcing fibers. The reinforcing fiber capable of being oriented along the flow of the additive manufacturing ink composition or along any direction imparted to the fiber after the of additive manufacturing ink composition may be synthetic fibers or natural fibers. Exemplary synthetic fibers are carbon fibers, glass fibers, nylon fibers, polyester fibers, ultra-high-molecular-weight polyethylene fibers or aramid fibers. Natural fibers are for example cellulose, silk, hemp, flax, linen, jute, sisal or cotton fibers. The orientation of the fibers along the flow of the additive manufacturing ink composition or along any direction imparted to the fibers after the of additive manufacturing ink composition results in an anisotropic reinforcing effect in the respective direction. In general, the reinforcing fibers are in particular short reinforcing fibers having lengths in the range of from 200 to 600 µm, preferably of from 250 to 400 µm, but can also be continuous fibers. When the fibers are oriented along any direction after the deposition of the additive manufacturing ink composition or the formation of a layer thereof, the orientation may be imparted by a magnetic field in the case where the fibers comprise or consist of a ferromagnetic material or by an electric field when the fibers comprise a polarized or electrically charged material.

The additive manufacturing ink composition according to the present invention are free of organic solvents such as for example toluol, DCM, THF and alkanes and are furthermore free of silicone oil. In this context, the term "free of" refers to less than 1 wt %, preferably less than 0.5 wt % and more preferably less than 0.1 wt %, based on the total weight of the additive manufacturing ink composition.

The additive manufacturing ink compositions according to the present invention can thus be tailored to exhibit certain mechanical properties. In particular, the additive manufacturing ink compositions can be adjusted to exhibit "soft", "intermediate" and "stiff" mechanical properties by varying the amount of crosslinking agent and/or the number of thiols per crosslinking agent molecule, the molecular weight and composition of the polysiloxane and/or solid particles. For instance, a "soft" additive manufacturing ink composition will be characterized in that it preferably comprises between 2 wt % to 15 wt % of the crosslinking agent at based on the total weight of the additive manufacturing ink composition and/or is essentially free from reinforcing polysiloxane resin, and/or the polysiloxane has a viscosity of up to 5000 cps or between 1500 to 3500 cps. On the other hand, an "intermediate" additive manufacturing ink composition will be characterized in that it comprises between 15 wt % and 20 wt % of the crosslinking agent at based on the total weight of the additive manufacturing ink composition and/or comprises optionally an amount of up to 50 wt % of a reinforcing polysiloxane resin with respect the total amount of polysiloxane in the additive manufacturing ink composition, and/or the polysiloxane has a viscosity of up to 30 000 cps or preferably between 5000 and 30 000 cps.

The "stiff" additive manufacturing ink composition will be characterized in that it comprises between 20 wt % and 35 wt % of the crosslinking agent at based on the total weight of the additive manufacturing ink composition and/or comprises optionally an amount of up to 50 wt % of a reinforcing polysiloxane resin with respect the total amount of polysiloxane in the additive manufacturing ink composition, and/or the polysiloxane has a viscosity of up to 30 000 cps or preferably between 5000 and 30 000 cps, and/or may optionally further comprise reinforcing fibers.

It is also an object of the present invention to provide a process for producing an additive manufacturing ink composition as described above, wherein the polysiloxane bearing a plurality of alkenyl groups and the crosslinking agent bearing a plurality of thiol groups are formed into an emulsion, by preferably dispersing the crosslinking agent bearing a plurality of thiol groups into a continuous phase of polysiloxane bearing a plurality of alkenyl groups. In order to form an emulsion, the polysiloxane bearing a plurality of alkenyl groups and the crosslinking agent bearing a plurality of thiol groups are subjected to effective mixing, for example in a planetary mixer at 2000 rpm for 5 minutes. In the case the additive manufacturing ink composition comprises a photoinitiator and/or an enhancer the photoinitiator and/or enhancer are combined with the polysiloxane bearing a plurality of alkenyl groups and the crosslinking agent bearing a plurality of thiol groups in order to be formed into an emulsion.

The solid particles comprised in the additive manufacturing ink composition can be either included before the formation of the emulsion or may be added to the already formed emulsion. In a preferred embodiment, the solid particles comprised in the additive manufacturing ink composition are added to the polysiloxane bearing a plurality of alkenyl groups and the crosslinking agent bearing a plurality of thiol groups and then are formed into an emulsion.

It is also an object of the present invention to provide a use of an additive manufacturing ink composition as described above for the additive manufacturing of an object. The additive manufacturing ink composition as described above display excellent viscoelastic properties that allow for a more convenient use of them in an additive manufacturing apparatus. The additive manufacturing ink composition forms a viscoelastic network, which is a crucial property for shape retention after deposition of the ink and before crosslinking. At the same time, the ink shows shear thinning behavior. Shear thinning means the viscosity is lowered under shear, thus facilitating extrusion. Shear thinning is a crucial property allowing consistent flow under shear, such as for example through a extrusion nozzle of an additive manufacturing apparatus using a direct ink writing method or shear exerted by the printing platform using a stereolithography apparatus (SLA).

It is also an object of the present invention to provide an ink cartridge configured for use in an additive manufacturing apparatus, said cartridge containing a volume of additive manufacturing ink composition as described above. The ink cartridge may provide a body having a cavity in which the volume of additive manufacturing ink composition can be kept, as well as an orifice connected on one side to the cavity and having a connector configured to connect to an additive manufacturing apparatus. The cavity as well as the orifice may be of variable geometry such as to push the additive manufacturing ink composition out of the cavity. For example, the cartridge may be a syringe equipped with a piston, a volumetric and/or a gravimetric extrusion mechanism and an orifice, where the piston can be actuated to push the additive manufacturing ink composition out of the syringe through the orifice, which is capable of being connected to the additive manufacturing apparatus. For example such an orifice may be a Luer-lock connector.

It is also an object of the present invention to provide a process of additive manufacturing an object from an additive manufacturing ink compositions as described above, wherein said object is manufactured by dispensing or forming a layer of additive manufacturing ink composition and subsequently crosslinking said layer through exposure to UV/Vis radiation, in particular through exposure to radiation having a wavelength of from 365 nm to 420 nm, before dispensing or forming a further layer of additive manufacturing ink composition, and wherein said layer is preferably formed from a plurality of layer domains comprising additive manufacturing inks of different composition for example by weight or chemical nature of with respect to the crosslinking agent, polysiloxane or solid particles. The additive manufacturing ink composition as described above displays excellent rheological properties that allow for a more convenient use of them in an additive manufacturing apparatus, and that allow to use a printing pressure of from 500-4000 kPa and/or a print speed of from 4 to 10 mm/s when using a nozzle having an inner diameter 0.58 mm. For example, forming a plurality of layer domains comprising additive manufacturing inks of different compositions for example by weight or chemical nature with respect to the crosslinking agent, polysiloxane or solid particles can be achieved by using an additive manufacturing apparatus, which is configured to hold a plurality of additive manufacturing ink composition cartridges, which differ in the amount of crosslinking agent, polysiloxane or solid particles and which is configured to selectively dispense or form the required additive manufacturing ink composition into the respective layer domain.

It is also an object of the present invention to provide a process of additive manufacturing an object from an additive manufacturing ink compositions as described above, wherein said object is manufactured by first dispensing or forming multiple layers of additive manufacturing ink composition from a nozzle until a green object or a part thereof is formed and by subsequently crosslinking the multiple layers of the green object or a part thereof through exposure to UV/Vis radiation, in particular by exposure to radiation having a wavelength of from 365 nm to 420 nm, and wherein said layer is preferably formed from a plurality of layer domains comprising additive manufacturing inks of different composition for example by weight or chemical nature with respect to the crosslinking agent, polysiloxane or solid particles. The additive manufacturing ink composition as described above displays excellent rheological properties that allow for a more convenient use of them in an additive manufacturing apparatus, and that allow to use a printing pressure of from 500-4000 kPa and/or a print speed of from 4 to 10 mm/s when using a nozzle having an inner diameter 0.58 mm. The crosslinking the multiple layers of the green object can be carried out by exposing the green object to UV/Vis radiation for a certain time, e.g. 30 seconds.

It is thus also an object of the present invention to provide an object obtained by any one of the above processes of additive manufacturing an object, characterized in that it comprises a plurality of domains comprising cross-linked additive manufacturing inks exhibiting variable mechanical properties such as for example strength, stiffness, elasticity, flexibility, durability, ductility, toughness, hardness, resilience, fatigue, elongation at break, Young's modulus, yield strength, etc. wherein in particular the object is a pneumatic soft robotics actuator. Thus, the overall mechanical properties of such a multi-material object are determined by the plurality of domains comprising cross-linked additive manufacturing inks and consequently exhibiting variable mechanical properties, i.e. by for example having a plurality of domains comprising at least two of "soft", "intermediate" or "stiff" cross-linked additive manufacturing inks or variations thereof.

EXAMPLES

To obtain additive manufacturing ink compositions that can be printed by in an additive manufacturing apparatus, vinyl-terminated silicones of different molecular weights were combined with varying amounts of a multivalent low molecular weight thiol crosslinker and silica to obtain different mechanical properties. The amount of photoinitiator and enhancer was kept constant.

The soft additive manufacturing ink, intermediate additive manufacturing ink and stiff additive manufacturing ink were composed as shown in Table 1.

The soft ink was based on a vinyl-terminated silicon "EcoFlex 00-30 A", to which 4 wt % of pentaerythritol tetrakis (3-mercaptopropionate), herein referred to as "4SH" and 5 wt % hydrophobic fumed silica was added.

The intermediate ink was based on a mixture of a Q resin silicon and a vinyl-terminated silicon "DragonSkin 30 A" at a mass ratio of 1:1, to which 18.5 wt % 4SH and 5 wt % hydrophobic fumed silica were added.

The stiff ink was based on a mixture of Q resin silicon and a vinyl-terminated silicon "Sylgard 184" at a 1:1 mass ratio to which 33 wt % 4SH and 10 wt % hydrophobic fumed silica were added. For further reinforcement 15 wt % functionalized flax short fibers (280 μm) were also added to the stiff ink.

The silicone, 4SH, HHPK and Enhancer were mixed with a planetary mixer (ARE-250, Thinky, USA) for 5 min at 2000 rpm, followed by the addition of the hydrophobic fumed silica. The ink was then mixed and degassed thoroughly for 5 min at 2000 rpm and 5 min at 2200 rpm, respectively.

In the thus obtained additive manufacturing inks, the silicone forms the continuous phase of the resulting emulsion, whereas the thiol crosslinker remains as homogeneously distributed disperse phase by the addition of emulsion stabilisers in the form of fumed silica. The process is solvent free and does not require chemical modification of the constituents.

TABLE 1

Formulations for the soft, intermediate and stiff additive manufacturing ink.

| Components | Soft ink | Intermediate ink | Stiff ink |
|---|---|---|---|
| Silicone | 1 g Ecoflex 00-30 A | 0.5 g Dragonskin 30 A | 0.5 g Sylgard 184 |
| Vinyl Q-Resin Dispersion VQM-135 | — | 0.5 g | 0.5 g |
| Pentaerythritol tetrakis (3-mercapto-propionate) (4SH) | 0.03 mL | 0.23 mL | 0.5 mL |
| Hydroxycyclohexyl phenyl ketone (HHPK) | 0.03 g | 0.03 g | 0.03 g |
| 9-Vinylcarbazole (Enhancer) | 0.005 g | 0.005 | 0.005 g |
| Wacker HDK Fumed silica H18 | 0.05 g | 0.05 g | 0.1 g |
| Flax fibers | — | — | 0.15 g |

Figure 1:
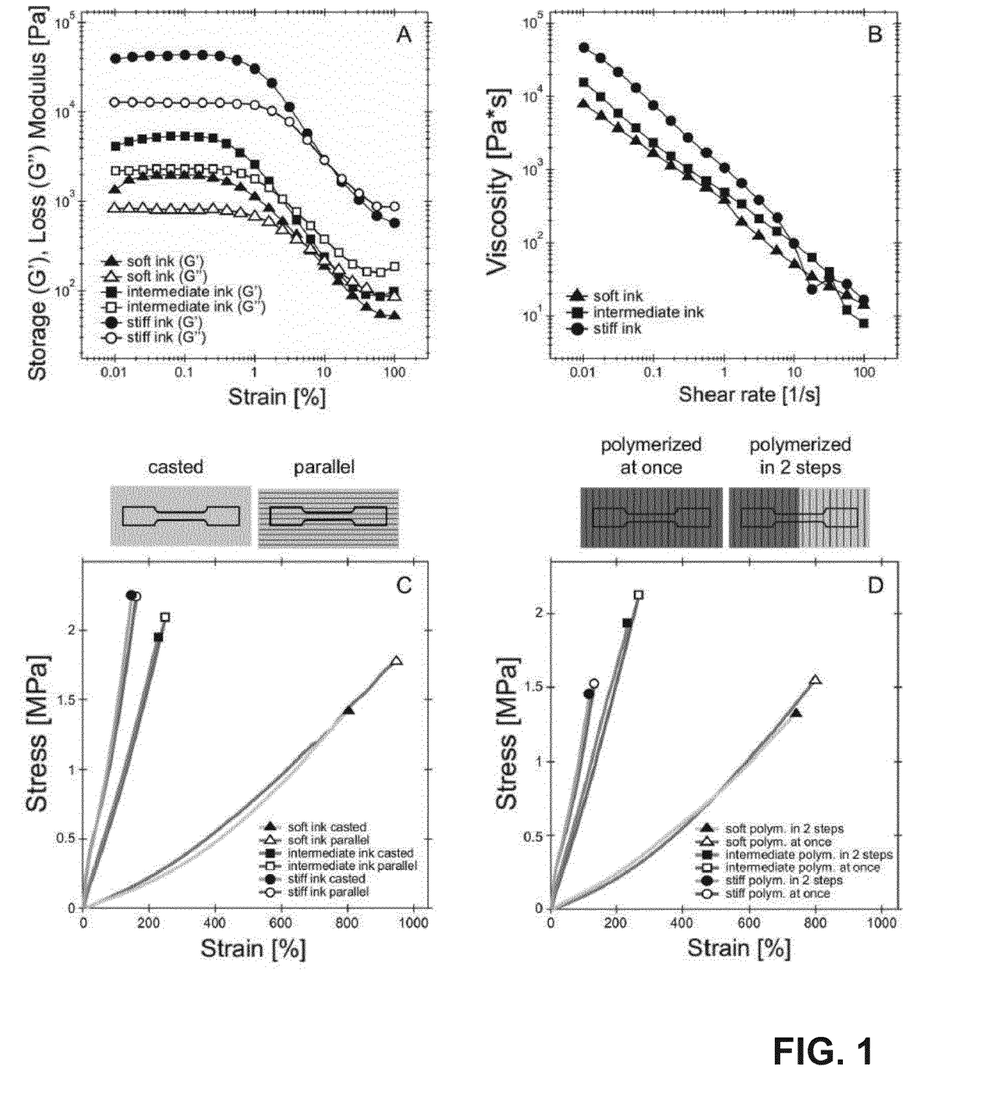
Figure 2:
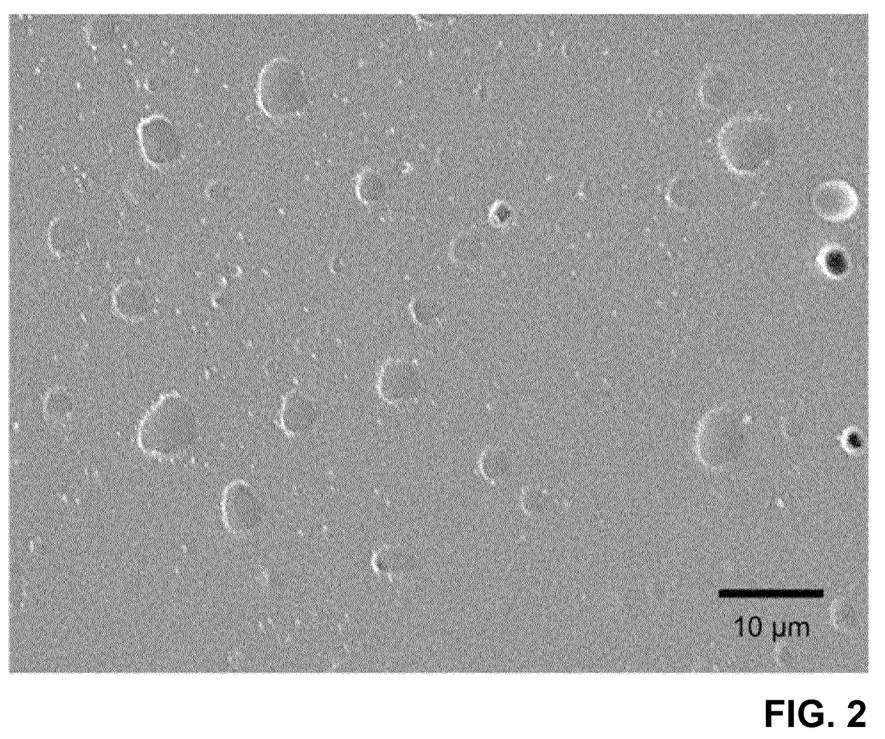
FIG. 2 shows a SEM micrograph of the emulsion of the additive manufacturing ink composition, in which the polysiloxane bearing a plurality of alkenyl groups is represented by the continuous phase and the crosslinking agent bearing a plurality of thiol groups is represented by the dispersed phase.
Figure 3:
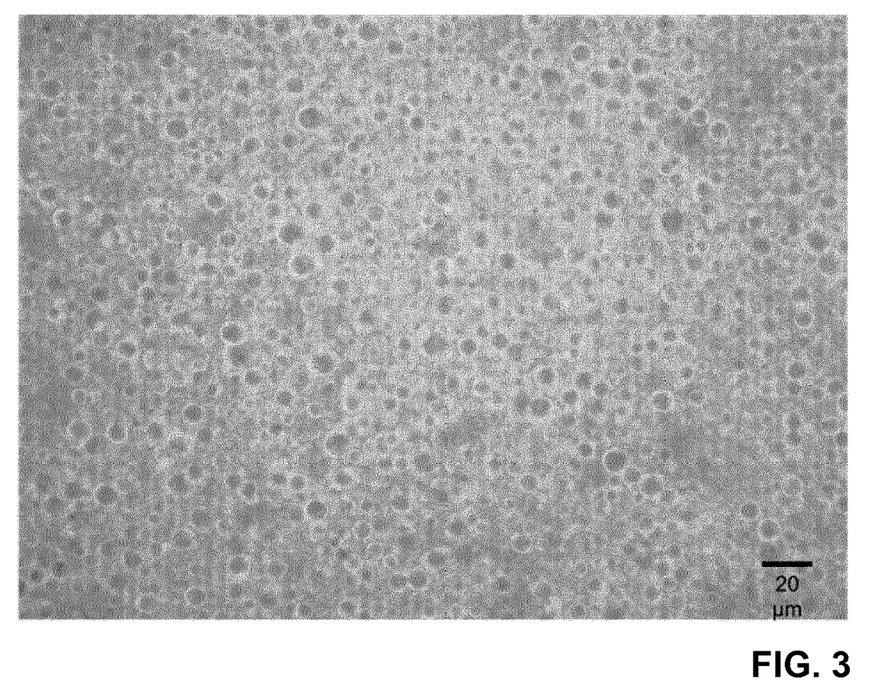
FIGS. 3 and 4 show optical microscope images of an emulsion forming the additive manufacturing ink composition, in which the polysiloxane bearing a plurality of alkenyl groups is represented by the continuous phase and the crosslinking agent bearing a plurality of thiol groups is represented by the dispersed phase.
Figure 4:
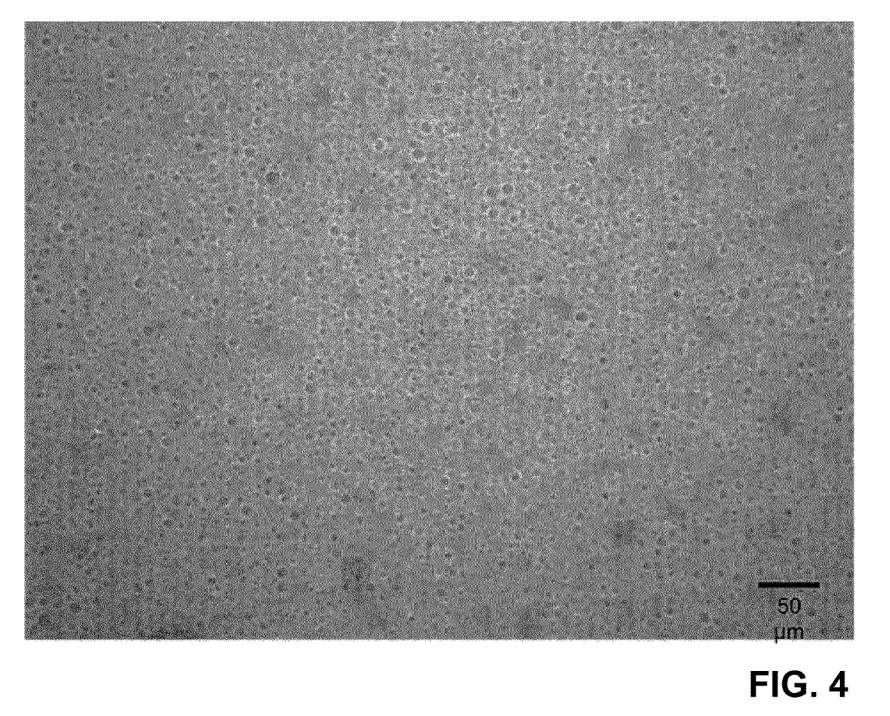

To characterize the rheology of the thus obtained inks prior to 3D printing, a MCR501 rheometer with cone-plate geometry (CP 25, Anton Paar, Austria) was used. Experiments were conducted at 20° C. Oscillatory amplitude sweeps at 1 s$^{-1}$ were performed within strain values ranging from 0.01 to 100%, whereas steady-state flow curves were obtained at shear rates varying between 100 and 0.01 s$^{-1}$. The results are depicted in FIG. 1A where storage modulus, G', and loss modulus, G", of the soft, intermediate and stiff inks as a function of the strain amplitude applied in an oscillatory sweep measurement are shown. In each case, a crossover at high strains indicates the presence of a predominantly elastic network at rest, which is crucial for shape retention after extrusion through the nozzle of a 3D printer. In FIG. 1B, it is visible that all inks exhibit shear-thinning behavior, which is evidenced by the decrease in viscosity at higher shear rates under steady-state conditions. In combination with the viscoelastic network formation, shear thinning guarantees a consistent flow through the nozzle and enables high printing accuracy with a spatial resolution as low as 300 μm.

To characterize the mechanical properties of the thus obtained inks after crosslinking, inks were either casted between two glass slides with a thickness of 1 mm or 3D printed using a 3D Discovery platform (regenHU Ltd, Switzerland). Prior to printing, the inks were filled into cartridges and centrifuged at 3000 rpm for 30 s. Cylindrical needles with an inner diameter of 0.58 mm (H. Sigrist & Partner AG, Switzerland) were used and a print speed between 4 and 10 mm/s was chosen. Printing pressures in the range of 500-4000 kPa were applied and individually adjusted for each of the silicone inks. The interface was tested by printing and subsequent polymerization of specimens with a single layer thickness. Following the polymerization, an adjacent second layer was printed next to the already cured layer at the same height. Curing for 60 s was performed using an OmniCure Series 1000 (Excelitas, USA) under a nitrogen enriched atmosphere. After the polymerization of the adjacent layer, tensile samples were punched perpendicular to the printing direction. Mechanical tests were performed at a 20 mm/min at a pre-force of 0.05 N using an Autograph ASG-X mechanical testing machine (Shimazu, Japan). The elastic modulus was determined between 0.5 and 5% strain. Reported values for ultimate tensile strength, elastic modulus and elongation at break were averaged over at least five samples. In FIG. 1C, the each of the inks was tested parallel to the printing direction and compared to the casted samples. Being printed did not adversely affect the rupture strength of the any of the inks after crosslinking. In FIG. 1D, the influence of the polymerization protocol on the bonding strength between printed filaments is evaluated. For each of the inks, a continuous film that was crosslinked after 3D printing is compared to a film where crosslinking was carried out halfway through the print. The bonding strength between filaments directly crosslinked after deposition is not affected in comparison to a film deposited continuously in one run and crosslinked after printing. All samples were tested perpendicular to the printing direction.

Materials

EcoFlex 00-30 A and DragonSkin 30 A were purchased from Smooth-On (USA), whereas Sylgard 184 was acquired from DowCoring (USA). Pentaerythritol tetrakis(3-mercapto-proprionate) (abbreviated as 4SH) and 9-vinylcarbazole (abbreviated as enhancer) were purchased from Sigma-Aldrich (Switzerland). 1-Hydroxycyclohexyl phenyl ketone (abbreviated as HHPK) was provided by TCI (Japan) and silanol-trimethylsilyl modified Q resin (abbreviated as Q resin) was purchased from Gelest Inc (USA). Hydrophobic fumed silica HDK H18 and hydrophilic fumed silica V15 were supplied by Wacker (Germany) and the short flax fibers were provided by Ruthmann (Germany). For the fiber hydrophobization chlorotis-(trimethylsiloxy)-silane (abbreviated as CTS) from ABCR (Germany) was used combined with pyridine 95% from Sigma-Aldrich (Switzerland).

The invention claimed is:

1. An additive manufacturing ink composition comprising:
   a polysiloxane bearing a plurality of alkenyl groups and a crosslinking agent bearing a plurality of thiol groups,
   wherein the polysiloxane bearing the plurality of alkenyl groups and the crosslinking agent bearing the plurality of thiol groups form an emulsion,
   wherein the polysiloxane bearing the plurality of alkenyl groups forms a continuous phase of the emulsion and the crosslinking agent bearing the plurality of thiol groups forms a discontinuous phase, and
   wherein the discontinuous phase comprises droplets having a diameter of less than 100 micrometers.

2. The additive manufacturing ink composition according to claim 1, wherein the crosslinking agent is capable of being activated upon exposure to radiation or a change in temperature.

3. The additive manufacturing ink composition according to claim 1, further comprising a crosslinking enhancer compound.

4. The additive manufacturing ink composition according to claim 1, further comprising solid particles in an amount such that a viscosity of the composition is in excess of 10 Pa*s.

5. The additive manufacturing ink composition according to claim 3, wherein the crosslinking enhancer compound is a carbazole compound bearing at least an N-alkenyl group.

6. The additive manufacturing ink composition according to claim 1, wherein the polysiloxane bearing the plurality of alkenyl groups is a α, ω-alkenyl terminated polysiloxane bearing the plurality of alkenyl groups.

7. The additive manufacturing ink composition according to claim 1, wherein the crosslinking agent bearing the plurality of thiol groups has at least three thiol groups.

8. The additive manufacturing ink composition according to claim 1, further comprising a free radical photoinitiator capable of being activated upon exposure to radiation.

9. The additive manufacturing ink composition according to claim 1, further comprising an electrically conductive material in an amount sufficient to confer electrical conductivity to at least one of the additive manufacturing ink composition and a reinforcing fiber capable of being oriented along a flow of the additive manufacturing ink composition or along any direction imparted to the fibers after the of additive manufacturing ink composition by exposure to at least one of magnetic or electrical field.

* * * * *